US006199198B1

(12) United States Patent
Graham

(10) Patent No.: US 6,199,198 B1
(45) Date of Patent: *Mar. 6, 2001

(54) COMPUTER SYSTEM, METHOD, AND ARTICLE OF MANUFACTURE FOR VISUALIZING DIFFERENCES BETWEEN DESIGN ARTIFACTS AND OBJECT-ORIENTED CODE

(75) Inventor: Stephen Graham, Chapel Hill, NC (US)

(73) Assignee: International Business Machines Corp., Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,400

(22) Filed: Dec. 10, 1997

(51) Int. Cl.[7] .................................................. G06F 9/445
(52) U.S. Cl. ...................... 717/4; 717/1; 717/3; 717/11
(58) Field of Search .................................... 395/704, 703, 395/705; 717/1, 2, 6, 7, 8, 9, 4, 11

(56) References Cited

U.S. PATENT DOCUMENTS

| 5,446,911 | * | 8/1995 | Juso et al. .............................. 395/703 |
| 5,586,311 | * | 12/1996 | Davies et al. ............................. 707/1 |
| 5,680,530 | * | 10/1997 | Selfridge et al. ..................... 395/140 |
| 5,758,122 | * | 5/1998 | Corda et al. .......................... 395/500 |
| 5,787,412 | * | 7/1998 | Bosch et al. .............................. 707/2 |
| 5,803,334 | * | 9/1998 | Nickolas et al. ..................... 345/357 |
| 5,862,386 | * | 1/1999 | Joseph et al. ........................... 717/11 |
| 5,918,053 | * | 6/1999 | Graham .................................... 717/4 |

OTHER PUBLICATIONS

IBM Technical Disclosure Bulletin, "Integrating Structured Analysis and Structured Design", vol. 37, No. 12, pp. 161–164, Dec. 1994.*

IBM Technical Disclosure Bulletin, "Measurement System for User Interface Design", vol. 34, No. 2, pp. 443–445, Jul. 1991.*

Muller et al., "A Reverse Engineering Environment Based on Spatial and Visual Software Interconnection Models", ACM, pp. 88–98, Dec. 1992.*

Imai et al., "Hypermedia Conversation Recording to Preserve Informal Artifacts in Realtime Collaboration", ACM, pp. 417–424, Dec. 1992.*

Nagaoka et al., "A Reverse Engineering Method and Experiences for Industrial COBOL System", IEEE, pp. 220–228, May 12, 1997.*

* cited by examiner

Primary Examiner—Tariq R. Hafiz
Assistant Examiner—Ted T. Vo
(74) Attorney, Agent, or Firm—A. Bruce Clay; Morgan & Finnegan, LLP

(57) ABSTRACT

A process displays differences between design artifacts and object-oriented code. The process includes the step of displaying a first design artifact depicting an existing design of a first object, including an existing method and an existing collaboration relationship with a second object. The process continues by storing modified object oriented code representing a modified design of the first object, including a modified method. The process continues by displaying in a second design artifact, results of design virtual machine execution of the modified method. Then the process identifies a modified collaboration relationship with the second object by analyzing a modified message from the modified method to the second object. The process displays the modified collaboration relationship with the second object by juxtaposing at least portions of the first and second design artifacts. The modified collaboration relationship can be displayed as highlighted by different shades of gray or by different colors. The process can also display in the second design artifact, changes in attributes of the first object or changes between the existing method and the modified method of the first object. The design artifact can be displayed as a CRC report format, as an Object Structure Diagram format, or an Object Interaction Diagram format.

30 Claims, 16 Drawing Sheets

COMPUTER SYSTEM, METHOD, AND ARTICLE OF MANUFACTURE FOR VISUALIZING DIFFERENCES BETWEEN DESIGN ARTIFACTS AND OBJECT-ORIENTED CODE

BACKGROUND OF THE INVENTION

1. Field of the Invention

This invention relates to computer software, and in particular to a method and system for visualizing differences between design artifacts and object-oriented programming language code.

2. Description of the Related Art

Copending U.S. Patent Application of S. G. Graham, Ser. No. 08/769,916, filed Dec. 19, 1996, entitled "METHOD AND SYSTEM FOR DIAGRAMING COLLABORATIONS DEDUCED FROM SMALLTALK CODE USING A DESIGN VIRTUAL MACHINE", assigned to the International Business Machines Corporation, is incorporated herein by reference.

Copending U.S. Patent Application of S. L. Burbeck, Ser. No. 08/769,910, filed Dec. 19, 1996, entitled "METHOD AND SYSTEM FOR SYNCHRONIZING CODE WITH DESIGN", assigned to the International Business Machines Corporation, is incorporated herein by reference.

BACKGROUND

Software designs, much like abstract analogs (such as maps and blueprints), are built because they are useful for explaining, navigating, and understanding the richer underlying realities. With software, however, it is rare for even the most general design of an implemented system to be either complete or accurate. In many projects, senior programmers brainstorm on a white board, produce the program and produce just enough of a retrospective design to satisfy management. In projects with formal analysis and design stages, the design may be accurate when it is first made, but it seldom matches the final implementation. As code is developed it diverges from the design. These changes are rarely transferred back to the design documents because programmers seldom take the trouble to find and edit the design documents. The lack of accurate design adds dramatically to the life cycle cost of software systems. Mismatches between design and code slow initial development of large systems because teams working on one portion of the system rely in part upon the design descriptions of other portions of a system. Inaccurate design has an even more dramatic effect on maintenance because maintenance done without understanding the underlying design is time consuming and prone to error.

Design and code can neither be completely separated from each other nor completely joined with one another. They overlap in that both describe the same system but are different because the intended audience of those descriptions are quite different. Design communicates the intent of the designers to other humans, while code communicates design intent to the machine. Humans share a vast common knowledge and can deal with abstractions but are weak at handling masses of detail. The machine is not hampered by details but is oblivious to abstraction and generality.

One prior art approach to synchronizing code and design supposes that if programmers are unable or unwilling to keep the code synchronized with design, perhaps programmers can be dispensed with and simply generate the code from the design. In some cases, such as when an application merely maintains a database, this approach works. However, for general programming this approach fails for several reasons. One of these reasons is that analysts and designers seldom, if ever anticipate all the details encountered in the actual coding. Programmers need to make changes that extend or "violate" the design because they discover relationships or cases not foreseen by the designers. Removing the programmers from the process does not impart previously unavailable omniscience to the designers. Additionally, most real world applications contain behavior that is best described with algorithmic expressions. Programming code constructs have evolved to effectively and efficiently express such algorithms. Calling a detailed description of algorithmic behavior "design" simply because it is expressed in a formalism that isn't recognizable as "code" does not eliminate the complexity of the behavior.

Another previously known method is the automated extraction of object structure from code. Some tools are available that can create more or less detailed object structure diagrams directly from C++ class definitions that contain inheritance and attribute type information. Some Smalltalk systems provide similar attribute "type" information that allows these tools to be similarly effective. Without the attribute information, tools can only extract the inheritance structure. This method does not actually parse and model code other than C++ header files or Smalltalk class definitions. Therefore, this approach can at best identify "has-a" and "is-a" relationships. These relationships may imply collaboration but this approach does not specifically identify any of the transient collaborations that are important for understanding design. In addition, it does not provide any information about algorithms.

Another method is the automated deduction of design by analyzing code execution. Collaborations implicit in Smalltalk code are difficult to deduce statically from the code and may not be fully determined until run time. However, Smalltalk is strongly typed at runtime so it may be determined exactly what kind of objects are participating in all collaborations by examining the receiver and the arguments involved in all message sends. The resulting information can be used to specify the collaborations observed during the execution. This method suffers from the following problems: (1) it requires test cases to exercise the code; each of these test cases must construct an initial state which is sometimes elaborate; (2) the test cases themselves require careful construction and may become obsolete as the system changes; (3) the effort needed to construct and maintain these test cases can be a deterrent to routine use of this technique; and (4) full coverage by the test cases is difficult to obtain and the degree of coverage is difficult to assess. This undermines confidence in the resulting design. Without full coverage, the extracted collaboration design is likely to be incomplete in important ways. For instance, the way a system is designed to handled the exceptional cases can be more telling than the way it handles the common ones.

Larger-grain object oriented design involves just a handful of basic elements:

1) Object structure: diagrammatic specification of which objects are in a model and how they are statically related, these diagrams are referred to as Object Structure Diagrams (OSDs);

2) CRC (Class, Responsibilities, Collaborators): short textual description of object behavior (responsibilities) and a list of other related classes (collaborators); and 3) Object interaction: diagrammatic and textual representation of the timing of interaction between objects in response to a particular event or transaction within a system, these diagrams are referred to as Object Interaction Diagrams (OIDs).

These three design artifacts are different perspectives depicting how objects collaborate within an object oriented system. These diagrams are artifacts of the design process in that they represent the system at a level of abstraction different from code. This design information is intended to communicate certain details of a system and elide other details (such as implementation in code). Design artifacts are produced for communication between human beings, for example, the designer and other development team members, the development team and the customer or etc.

Proper design artifacts, that are kept up to date in light of design defects found and removed throughout the software development life-cycle are expected by-products of a mature development process. Customers demand these artifacts from development teams in order to validate that their requirements are reflected in the system and to provide a higher level of abstraction from the code to help post-development teams understand and properly maintain the software.

The problem is that the design artifacts (if they exist at all) do not usually reflect the current reality as embodied in the working code. Design defects discovered during implementation do not get reflected in updated design artifacts. The design becomes out of date, and to the extent it is out of date, the danger of using the design artifacts to understand the system increases. Because the current practice of software development tends not to update design artifacts, design artifacts are not trusted and tend to be unused.

Furthermore, there is a need for a method and system which allows for a simple and efficient synchronization of code with design. The copending patent application by S. L. Burbeck, cited above, is directed to a method and system for synchronizing code with design which substantially reduces problems associated with such synchronization. It allows a developer to ensure that code matches design without having to write complete applications to test the code. Code is synchronized with design in an object oriented computer programming environment. Execution steps are created for a selected method. Then, as directed by the execution steps, the design is traced through one step at a time. Tracing requires that appropriate design information be fetched and that design violations are identified.

In the Burbeck method, static analysis is used to synchronize design and code. This static analysis is approached in a manner analogous to the way a virtual machine executes compiled Smalltalk code. A Smalltalk compiler converts Smalltalk source code into byte codes, which are interpreted by a virtual machine. This virtual machine (VM) supports Smalltalk, but can support other languages as well. The VM architecture is that of a stack machine. Byte codes define the pushing of objects from variables onto a stack, popping objects from the stack to store them into variables, and sending messages which pop their arguments and the receiver from the stack and push the result onto the stack. The byte codes themselves live within objects (compiled methods) t hat are executed under control of a virtual machine. Each invocation of a method or a block is managed by a MethodContext or BlockContext object which maintains an instruction pointer into its byte codes and provides private state (method and block temps and args). Active contexts (i.e., those that have begun but not finished execution) are on a separate context stack with the top most context being the one the virtual machine is actively executing. Returning from a method pops this context stack.

When a Smalltalk VM executes code, three categories of activities occur: (1) interpretation of byte codes that have been previously compiled from Smalltalk methods; (2) handling exceptions, especially DoesNotUnderstand, and handling of external events; and (3) the creation and destruction of objects (memory management). Almost all of the visible behavior of Smalltalk code occurs under the explicit direction of byte codes.

When code is read to understand its effects, the actual objects are mentally replaced with generic stand-ins. In a design VM machine, "qualifiers" stand in for the objects so described. A qualifier characterizes the objects that are qualified to occupy a variable given the role the variable plays in the design of the method. As such, the system of qualifiers proposed here is an object oriented (OO) type system. The term qualifier is used rather than "type" to avoid some of the confusion and debate about just what is an OO type. "Signatures", similarly, stand in for methods invoked as a result of a message send. Each method is described by a signature. A signature defines in a formal way the kind of object intended to be returned from the method and, if the method has arguments, the kinds of objects intended to occupy the arguments. The "kind of object" is specified by a qualifier. Thus, objects and message sends are well described by qualifiers and signatures respectively. Therefore, the design analog of the effect of executing code can be determined by creating a VM that "executes" Smalltalk code by replacing objects with qualifiers and messages with signatures. That is, where objects are pushed and popped to and from variables at runtime, qualifiers are pushed and popped to and from attributes by the design VM. Where messages are looked up by the VM at runtime, args pushed, appropriate method invoked, and the return value left on the stack, signatures are looked up by the design virtual machine, arg qualifiers pushed, and the return qualifier (as determined by the signature) is left on the stack. These activities are orchestrated by byte codes at runtime and by byte code analogs called ExecutionSteps in the design VM. ExecutionSteps can be generated by the Smalltalk parser in a manner very similar to its generation of byte codes.

An application of the method disclosed by Burbeck is the method and system disclosed in the copending patent application by S. G. Graham, cited above, which allows for simple and efficient diagraming of collaborations deduced from Smalltalk code using a design virtual machine. The copending patent application by S. G. Graham, cited above, is directed to a system that uses a design virtual machine to interpret execution over one or more methods to deduce collaborations. When collaborations are deduced in this manner, the system can visualize this deduction by creating and/or annotating changes in: Object Structure Diagrams, Object Interaction Diagrams, and CRC Reports. In one embodiment, a method displays results of design virtual machine execution of at least one method of an object oriented computer program. Execution steps are created for a selected method. As directed by the execution steps, the design is traced through one step at a time. The tracing comprises fetching appropriate design information and checking for design violations. The methods are then automatically displayed.

In typical development, design artifacts are produced before implementation begins (if they are produced at all). As implementation proceeds, defects in the original design are detected and some are eliminated in the code. Time pressure of many software development projects prevent these changes from being properly reflected in the design artifacts. Consequently, the design artifacts may not be trustworthy, many pragmatic software developers ignore the design artifact and gain understanding of the system by reading code. This is time consuming process, and one that does not necessarily yield a clean understanding of the design itself Object Structure Diagrams(OSDs) are the most popular mechanism to describe design information about an Object-Oriented system. Object Structure Diagrams represent classes (object types) as rectangular nodes. Associations (collaborations) between classes are represented as arcs.

A mechanism that can visualize the differences between an Object Structure Diagram and a body code from an object-oriented programming language (such as Java or Smalltalk) would allow the designer to discover deviations between the design and the implementation. These deviations could be due to legitimate design defects discovered during implementation, or they could be due to misunderstandings of design intent on part of the implementation team. Regardless, the designer can use this information to detect the difference and determine how to synchronize the design with the code, by either updating the design or modifying the code. Either way, the team ends up with design which reflects code reality, and therefore a plausible mechanism to back up their claim that the design and the code are synchronized.

SUMMARY OF THE INVENTION

The invention is a system and method for visualizing differences between design artifacts and object-oriented code. The invention has two aspects in maintaining design information in synch with code. First, the invention enables visualizing the differences between design and code. Second, the invention enables acting on the visualized differences. In accordance with the invention, visualization of differences between design and code has two steps: first, detecting the difference, and second, visualizing the difference. Further in accordance with the invention, detection of differences between design and code has two steps: first, reverse engineering a representation of the current state of the classes and methods into a meta-data format, and second, comparing the metadata reverse-engineering from the code and the meta-data associated with the design artifact. In accordance with the invention, classes and class hierarchies are derived directly from their representation in Smalitalk code, as are the attributes and methods of the class. The associations between classes are derived by aggregating the collaborations deduced by executing a design virtual machine.

The invention can be embodied as a computer system, as an article of manufacture for a computer system, or as a computer process. One aspect of the invention is a process of displaying differences between design artifacts and object-oriented code. The process includes the step of displaying a first design artifact depicting an existing design of a first object, including an existing method and an existing collaboration relationship with a second object. The process continues by storing modified object oriented code representing a modified design of the first object, including a modified method. The process continues by displaying in a second design artifact, results of design virtual machine execution of the modified method. Then the process identifies a modified collaboration relationship with the second object by analyzing a modified message from the modified method to the second object. The process displays the modified collaboration relationship with the second object by juxtaposing at least portions of the first and second design artifacts. The modified collaboration relationship can be displayed as highlighted by different shades of gray or by different colors. The process can also display in the second design artifact, changes in attributes of the first object or changes between the existing method and the modified method of the first object. The design artifact can be displayed as a CRC report format, as an Object Structure Diagram format, or an Object Interaction Diagram format.

DESCRIPTION OF THE PREFERRED EMBODIMENTS

Figure 1:
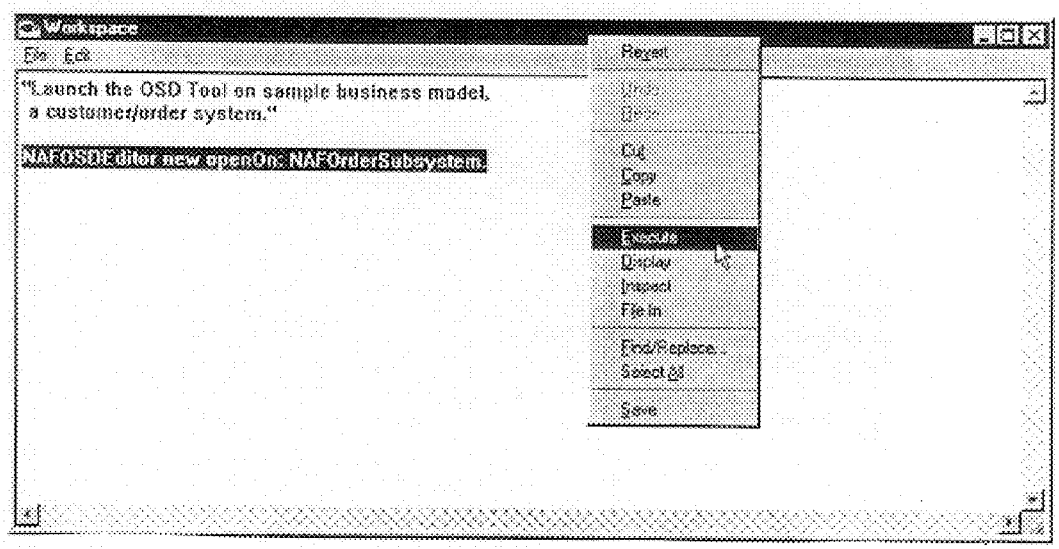
FIG. 1 shows the execution of a Smalltalk expression from a workspace window within the VisualAge for Smalltalk development environment. The execution of the expression will launch the window shown in FIG. 2.

In our solution, classes and class hierarchies are derived directly from their representation in Smalitalk code, as are the attributes and methods of the class. The associations between classes are derived by aggregating the collaborations deduced by executing a Design a Virtual Machine (described in the copending patent application by Burbeck cited above, over each method in the class.

The comparison is on a class basis. Any new classes introduced into the code can be directly reverse-engineered onto the diagram. However, if any of these classes are germane to the diagram begin updated, they will be included on the diagram by a newly added collaboration from a class that already; exists on the diagram.

The rest of the comparison is on a class by class basis. The properties of the class are compared to determine if any new attributes or methods have been added or any existing attributes or methods have been deleted. Further, collaborations on each class are checked to make sure that they still reflected in the code, and whether any new collaborations have been deduced.

We use color on the diagram (or figure outlines and text) to visualize the difference between and Object Structure Diagram and the design information reverseengineered from the code. For those classes, attributes, methods and collaborations that appear blue (exist in code, new to the diagram), the designer can either accept the changes (by saving the diagram, changing the color of the normal background color*), or remove the changes form the code. As our Object Structure Diagram is resident in the Smalltalk development environment, the nodes and arcs of the diagram are directly connected with classes and methods in the Smalltalk image. For those classes, attributes, methods and collaborations that appear in red (exist in the diagram, do not exist in the code), the designer can update the diagram by removing the elements from the diagram, or adding the elements to the Smalltalk code. The default background color of a figure is Black.

Which action the designer should take depends on the reason why the difference between the design and the implementation was introduced. This is a matter of communication between the designer and the implementation team to determine if the change represented a legitimate defect in the design, or whether it reflected a misunderstanding of the design on the part of the implementation team. The tool cannot determine which situation is the reason for the difference. It is the responsibility of the development team to interpret why the difference occurred and what the resolution should be.

Signatures, as described above with reference to the cited Burbeck application, is a tool used to deduce collaborations from code (and therefore to deduce differences between code and design). A design virtual machine, also described above with reference to the cited Burbeck application, is the mechanism of deducing collaborations from Smalitalk code augmented with Signatures.

DETAILED DESCRIPTION OF THE INVENTION

In this scenario, a body of Smalitalk code was created, but no accurate design diagram exists. The Smalltalk code is augmented with Signatures. Because the code is augmented with Signatures, the Design Virtual Machine can be executed on the body of code, deducing collaborations. This is fundamental to the production of an Object Structure Diagram depicting the classes and their collaborations within the body of Smalltalk code.

Creating an Object Structure Diagram from the code.

FIG. 1 shows the execution of a Smalltalk expression from a workspace window within the VisualAge for Smalltalk development environment. The execution of this expression will launch the window shown in FIG. 2.

Figure 2:
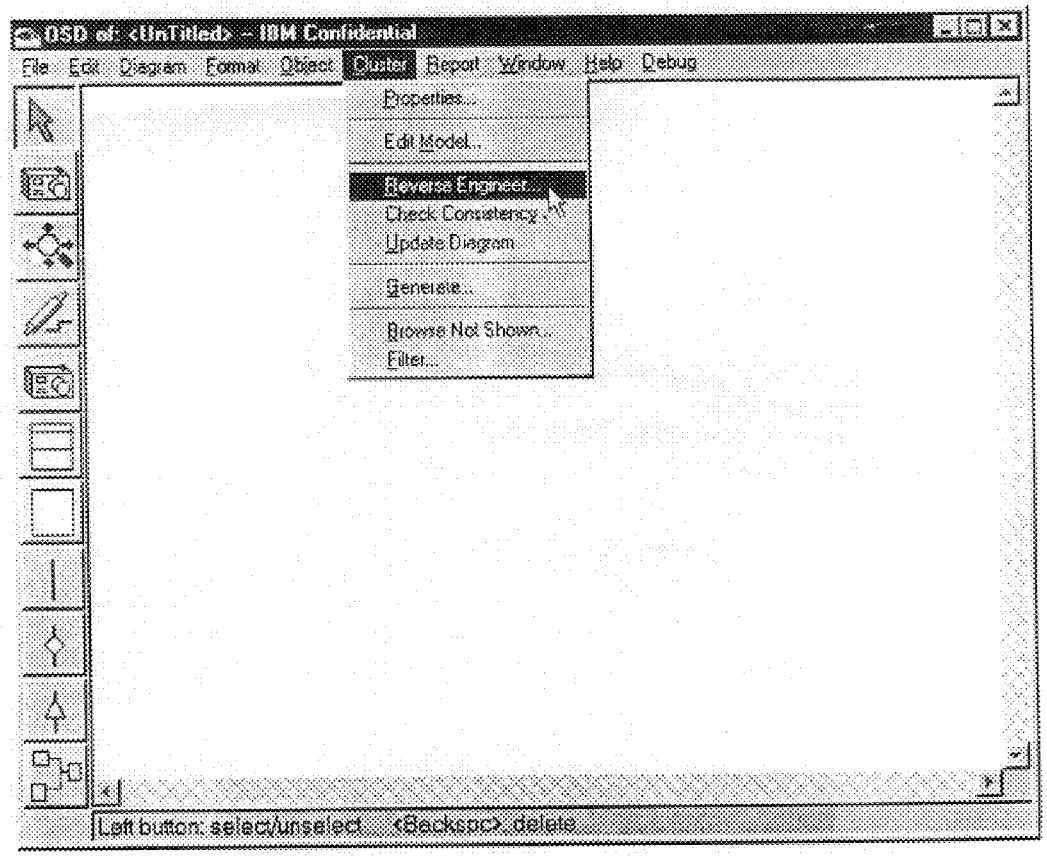
FIG. 2 shows a window of the Object Structure Diagram (OSD) Editor, containing a blank OSD diagram. The menu item labeled "Reverse Engineer . . . " is chosen. This will display a Reverse Engineering Dialog to appear on the screen, as depicted in FIG. 3.

FIG. 2 shows a window of the OSD Editor, containing a blank OSD diagram. The menu item labeled Reverse Engineer . . . is chosen. This will display a Reverse Engineering Dialog to appear on the screen, as depicted in FIG. 3.

Figure 3:
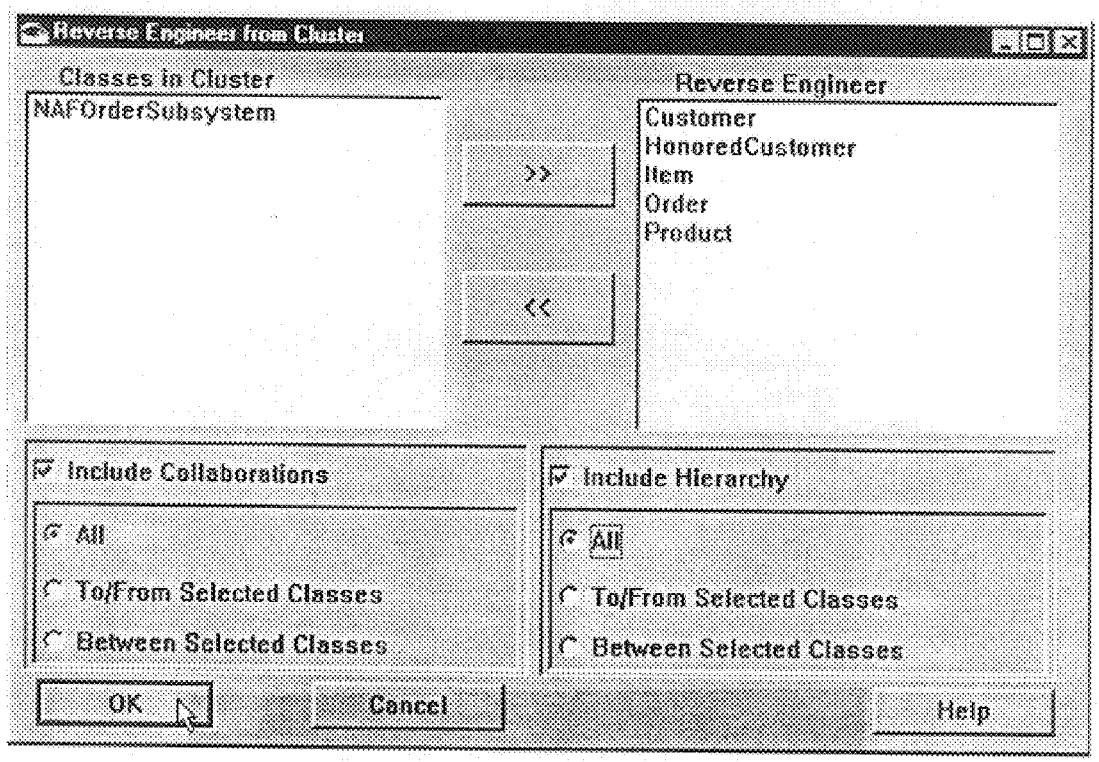
FIG. 3 shows a Reverse Engineering Dialog. In this dialog, the names of the classes to appear in the diagram are listed in the list pane at the top right. The result of selecting the button labeled OK appears in FIG. 4.

FIG. 3 shows a Reverse Engineering Dialog. In this dialog, the names of the classes to appear in the diagram are listed in the list pane at the top right. Classes that are in the application (cluster), but are not meant to be shown on the diagram are shown in the list pane at the top left. The check box labeled Include Collaborations is chosen, this will cause collaboration lines to appear between the classes on the diagram. This facility is further modified by the radio button labeled All, meaning that all collaborations between any classes on the diagram will be depicted. The check box labelled Include Hierarchy will cause hierarchy relationship lines to appear on the diagram. This is further modified by the radio button labelled All, meaning that hierarchical relationships between any classes on the diagram will be displayed. The result of selecting the button labelled OK appears in FIG. 4.

Figure 4:
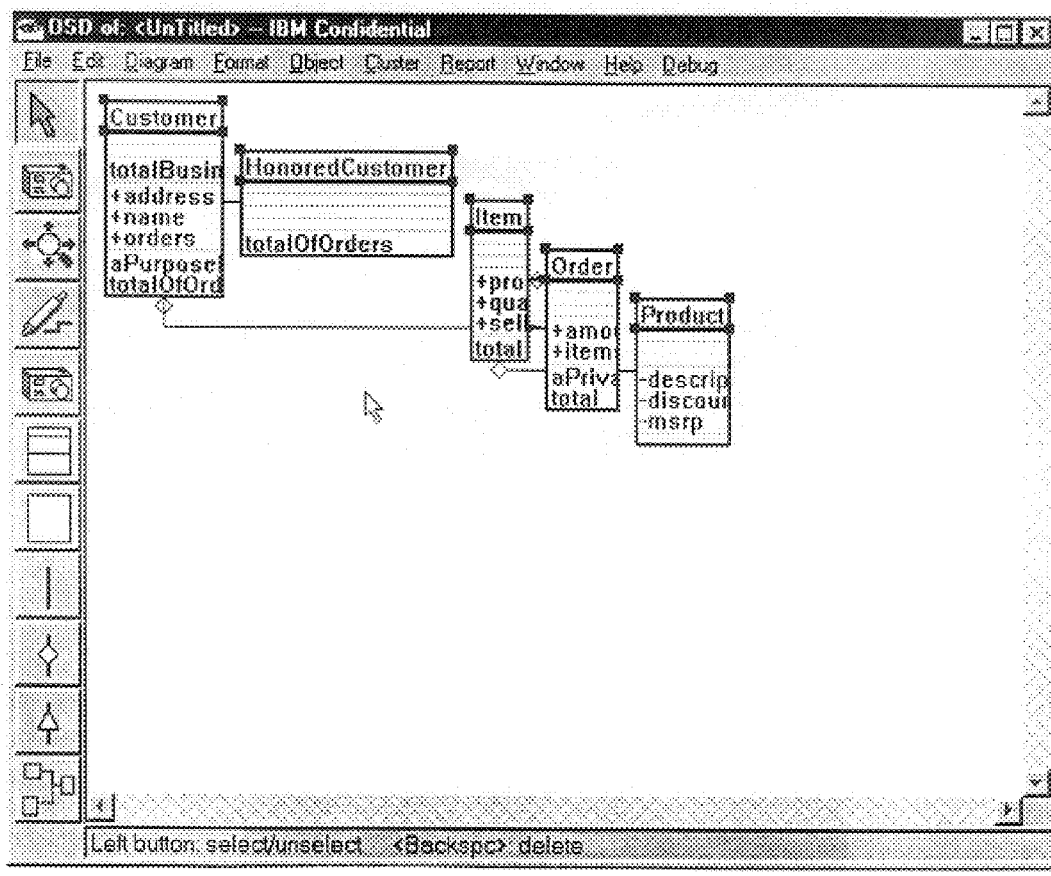
FIG. 4 depicts an Object Structure Diagram as reverse engineered from Smalltalk code with Signatures, based upon the specifications given in the Reverse Engineering Dialog as depicted in FIG. 3.

FIG. 4 depicts an Object Structure Diagram as reverse engineered from the Smalltalk code with Signatures, based upon the specifications given in the Reverse Engineering Dialog as depicted in FIG. 3. The diagram is exactly as it first appears, before it is rearranged to more clearly depict design information. The classes as chosen in the dialog depicted in FIG. 3 appear as labelled rectangles in the diagram. Each class rectangle is labelled with the name of the class at the top of the rectangle, and five rectangular subregions below. Each subregion is separated by a thin grey line. These rectangular subregions contain lists of items, depicting the contents of the class. The first (top most) subregion contains a list of all the class variables defined for the class. The second subregion contains a list of all the class instance variables defined for the class. The third contains a list of the class methods defined for the class. The fourth contains a list of all the instance variables defined for the class. The fifth (bottom most) subregion contains a list of the instance methods defined for the class. Subregions can be empty, indicating the class does not contain any items of that particular type.

Figure 5:
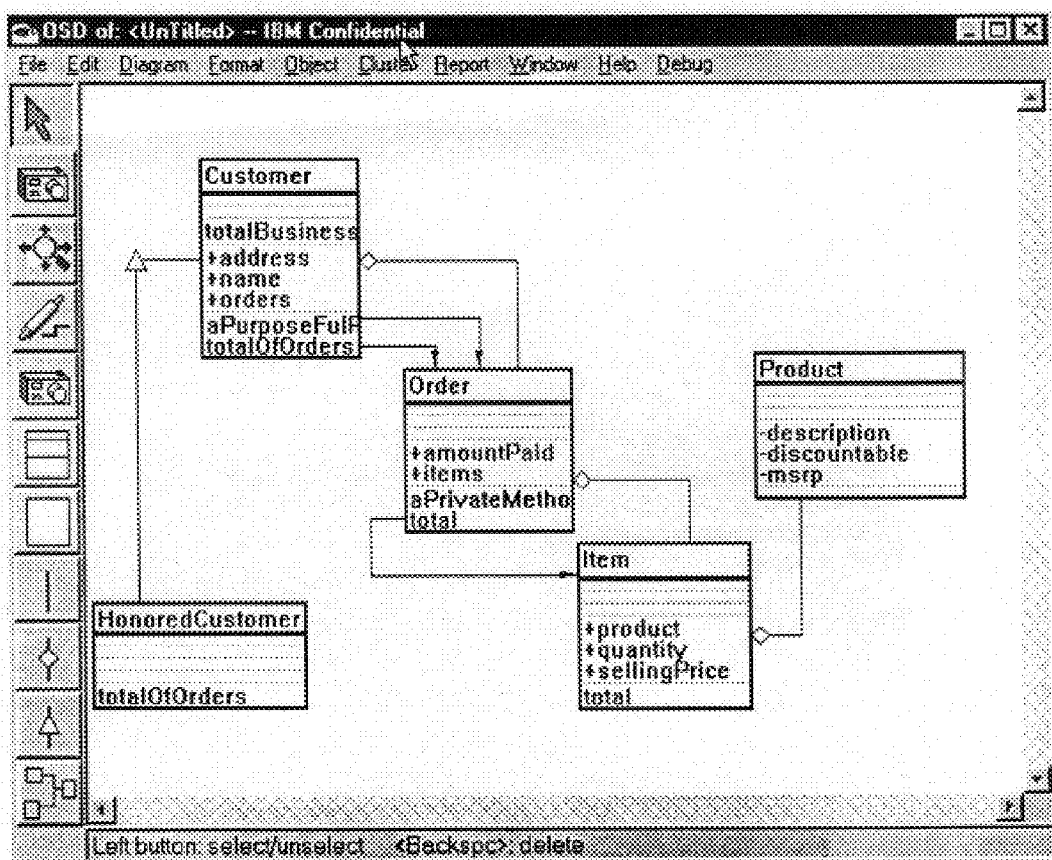
FIG. 5 shows the same Object Structure Diagram as depicted in FIG. 4, except that the figures have been rearranged to a layout that better depicts the diagram has not yet been saved.

Collaborations and hierarchical relationships are depicted as lines between classes on the object structure diagram. These lines are hard to read on the diagram as depicted in FIG. 4. FIG. 5 shows the same diagram graphically rearranged to a layout that better shows the classes and their collaborations and hierarchical relationships.

Note that the class rectangles and the collaboration and hierarchical relationship lines are colored blue. Color is used by convention to assign further semantic to the figure in the mind of the reader of the diagram. When a figure appears on a diagram in the color blue, the reader is, by convention, lead to infer that the figure has been newly added to the diagram since the diagram was last saved (committed). Since this was a brand new diagram and all the figures on the diagram have been newly placed on it by the result of successfully executing the Reverse Engineer step, all figures are colored blue.

Figure 6:
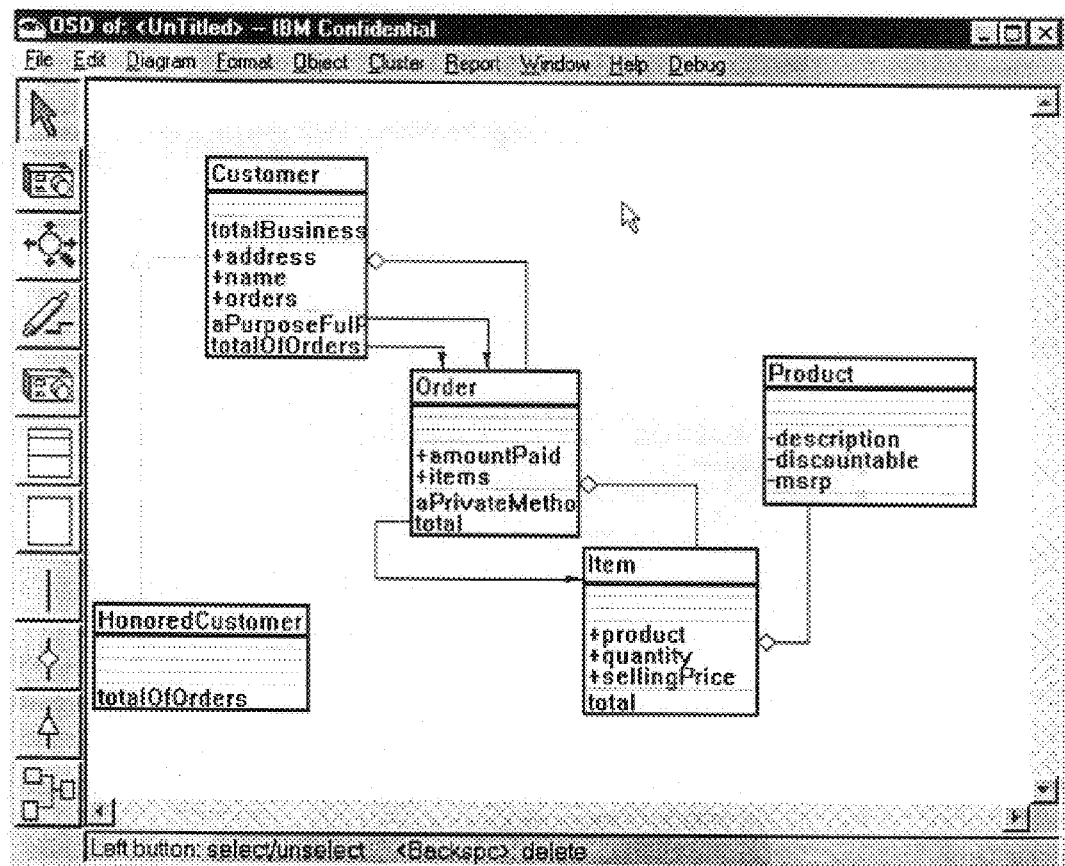
FIG. 6 shows the same diagram As FIG. 5, but after the save command has been executed.

FIG. 5 shows the same OSD as depicted in FIG. 4, except that the figures have been rearranged to a layout that better depicts the classes and their collaborations and hierarchical relationships. The figures are still colored blue because the diagram has not yet been saved. FIG. 6 shows the same diagram after the save command has been executed.

FIG. 6 shows the same diagram as depicted in FIG. 5 after the save command has been executed, committing or checkpointing the diagram to its current appearance.

Note that the figures in the diagram are no longer colored blue, the class rectangles and the collaboration lines are colored black and the hierarchy relationship lines are colored grey. We use a lighter shade to depict the hierarchy relationship lines so that they can easily be distinguished from the collaboration lines. Black (or grey) figures depict figures that have been committed to the diagram as it was last saved.

Figure 7:
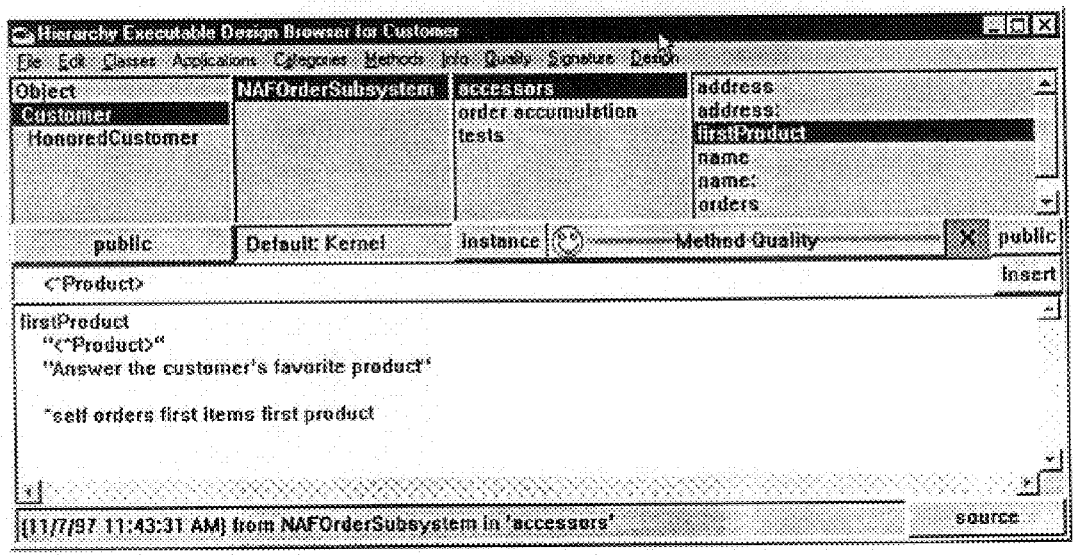
FIG. 7 shows an example change to the code.

FIG. 7 shows an example change to the code. You can imagine that between the time a diagram is saved and it is revisited. During this time, several changes to the code may have taken place. FIG. 7 depicts one such change to the code, in this case, a new method is added to the Customer class. The newly added method is named firstproduct. The figure shows an example code browser from VisualAge for Smalltalk code development environment. This browser has been enhanced to include facilities to support maintaining Signatures in the Smalltalk methods.

Note that this method defines two new collaborations between its class (Customer) and other classes. The sub-expression self orders first indicates a collaboration between an instance of the Customer class and the first method in an instance of the Order class. We can determine this base on the Design Virtual Machine computing that the design result of the sub-expression self orders is an instance of the class Orders. This computation is based on an analysis of the Signatures associated with various methods and variables in the Customer class and in the Order class. The sub-expression items first indicates a collaboration between the methods class (still the Customer class) and the Item class. Again, this is detected by the Design Virtual Machine based on an analysis of the Signature of the sub-expressions, methods and variables involved.

The object structure diagram can be modified to reflect the changes that have been made in the Smalltalk code since the diagram was last saved. This process involves steps similar to the ones taken to build the diagram from code in the first place (as depicted in FIGS. 1 and 2). The process involved to update the diagram is shown in FIGS. 8 and 9.

Figure 8:
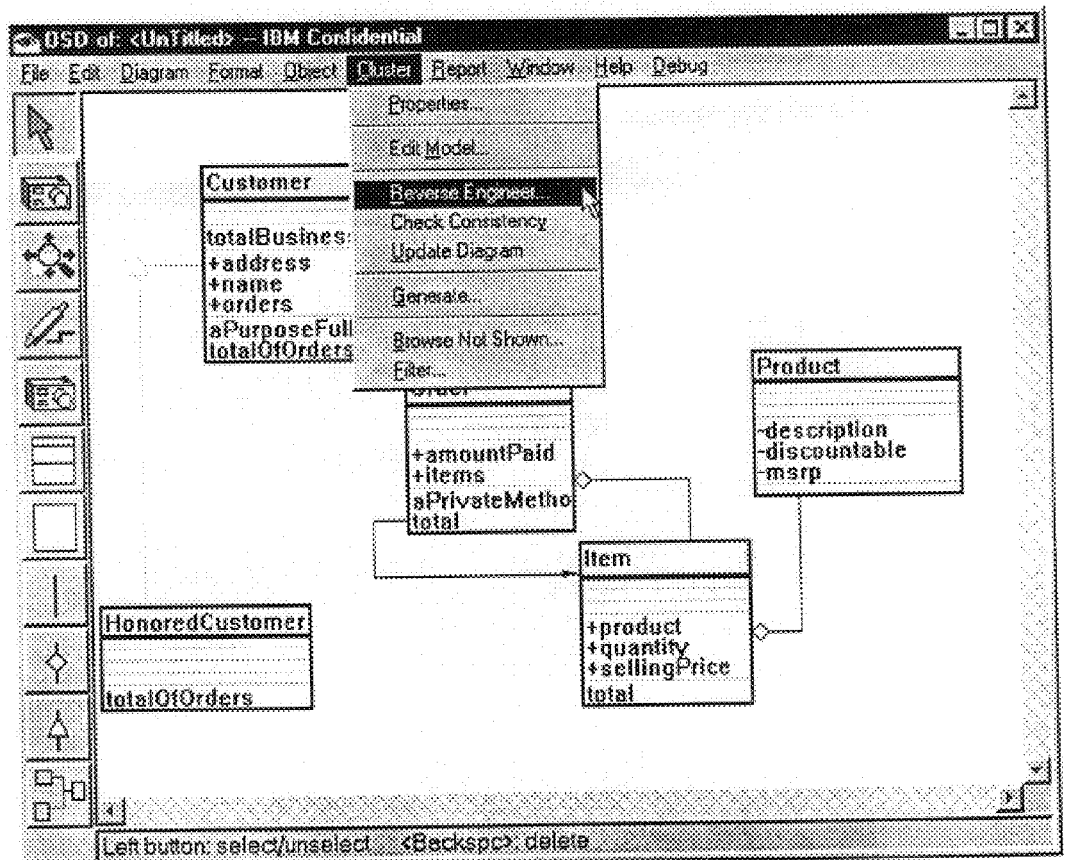
FIG. 8 shows making the choice of the Reverse Engineer menu item.

FIG. 8 shows the menu item labelled Reverse Engineer . . . being chosen from the menu labelled Cluster.

Figure 9:
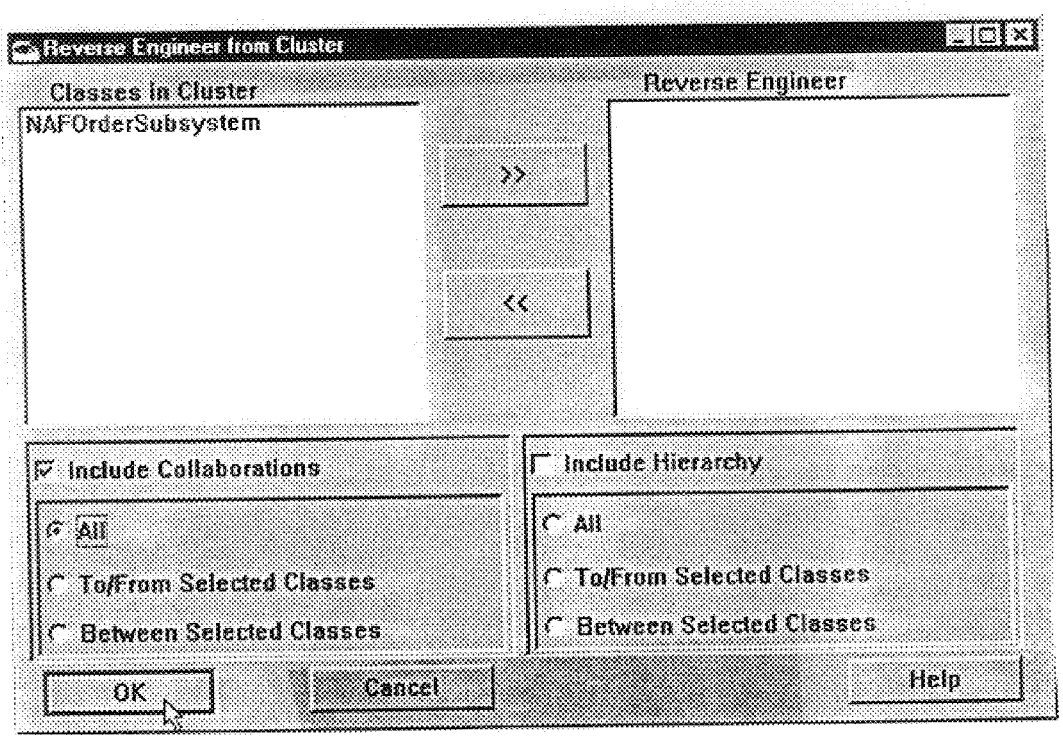
FIG. 9 shows the Reverse Engineer dialog in response to the choice in FIG. 8.

FIG. 9 shows the Reverse Engineer Dialog that appears as a result of choosing the Reverse Engineer . . . menu item. The user has chosen to reverse engineer all collaborations between classes depicted on the diagram. This choice is made by choosing the check box labelled Include Collaborations and further selecting the radio button labelled All.

Figure 10:
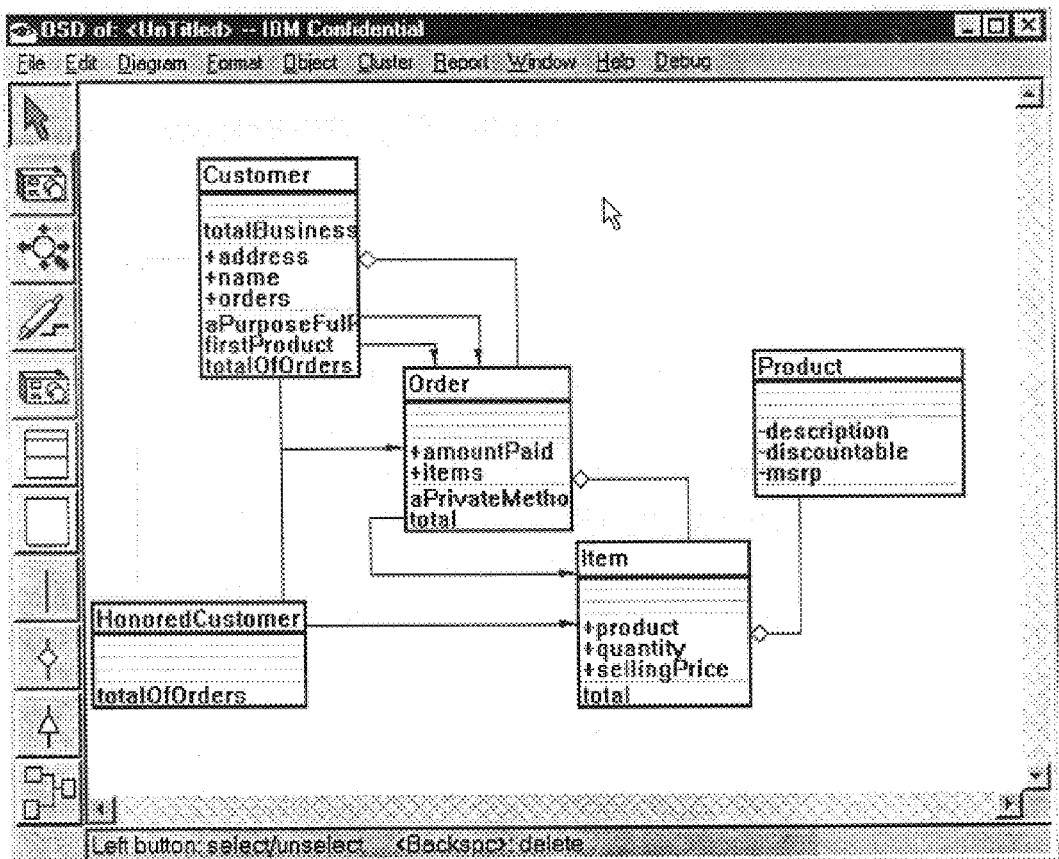
FIG. 10 shows the Object Structure Diagram updated with new collaboration lines, after the execution of the Reverse Engineer command.

FIG. 10 shows the diagram after the execution of the Reverse Engineer . . . command as specified in the Reverse Engineer Dialog shown in FIG. 9. Note that the item labelled firstProduct in the Customer rectangle is colored blue. The OSD editor has noted that this method was added to the Customer class since the diagram was last saved, and therefore uses the convention of the blue color. Further, the new collaborations introduced by the firstProduct method are shown as collaboration lines colored blue.

Figure 11:
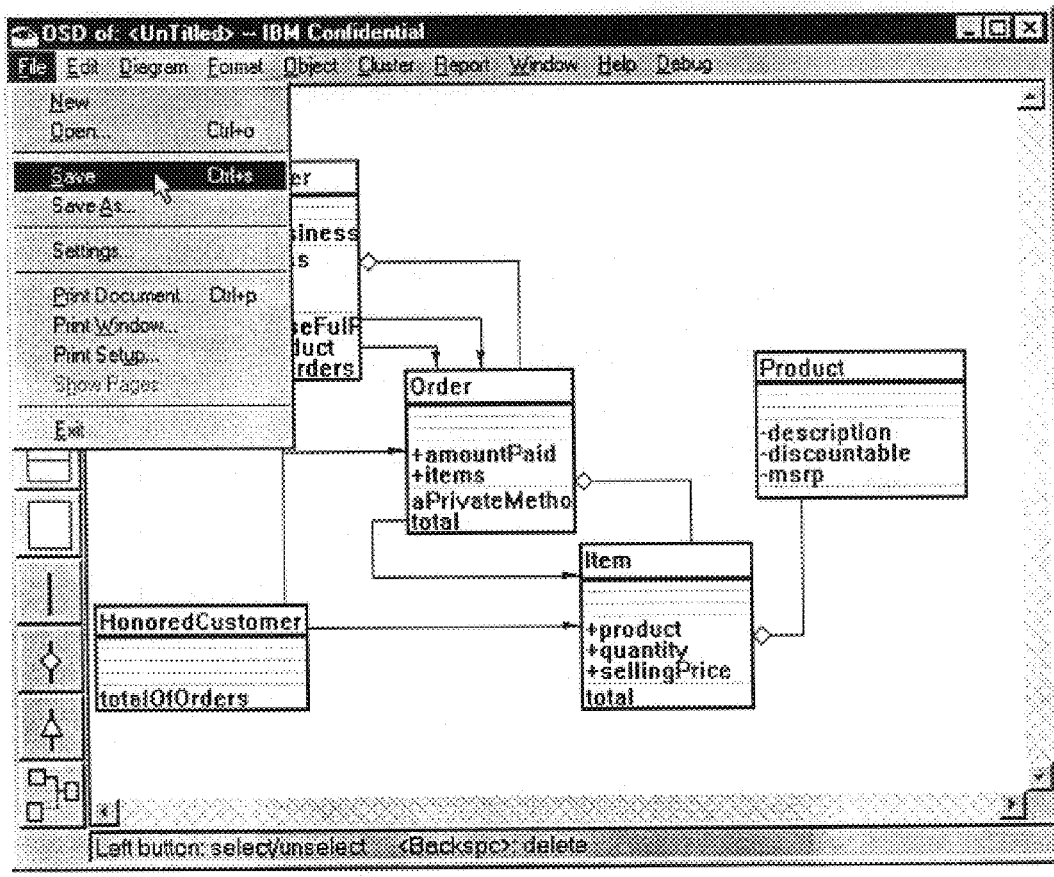
FIG. 11 shows the choice of the save menu to commit the changes to the Object Structure Diagram.

The designer would see the differences between the code and the design as shown in FIG. 10. The designer would then need to determine if the changes are acceptable or somehow deviate from his/her design intent. If these code changes were in fact acceptable, the design diagram needs to be updated to reflect this fact. FIG. 11 shows the choice of the save menu to commit the changes to the diagram.

Figure 12:
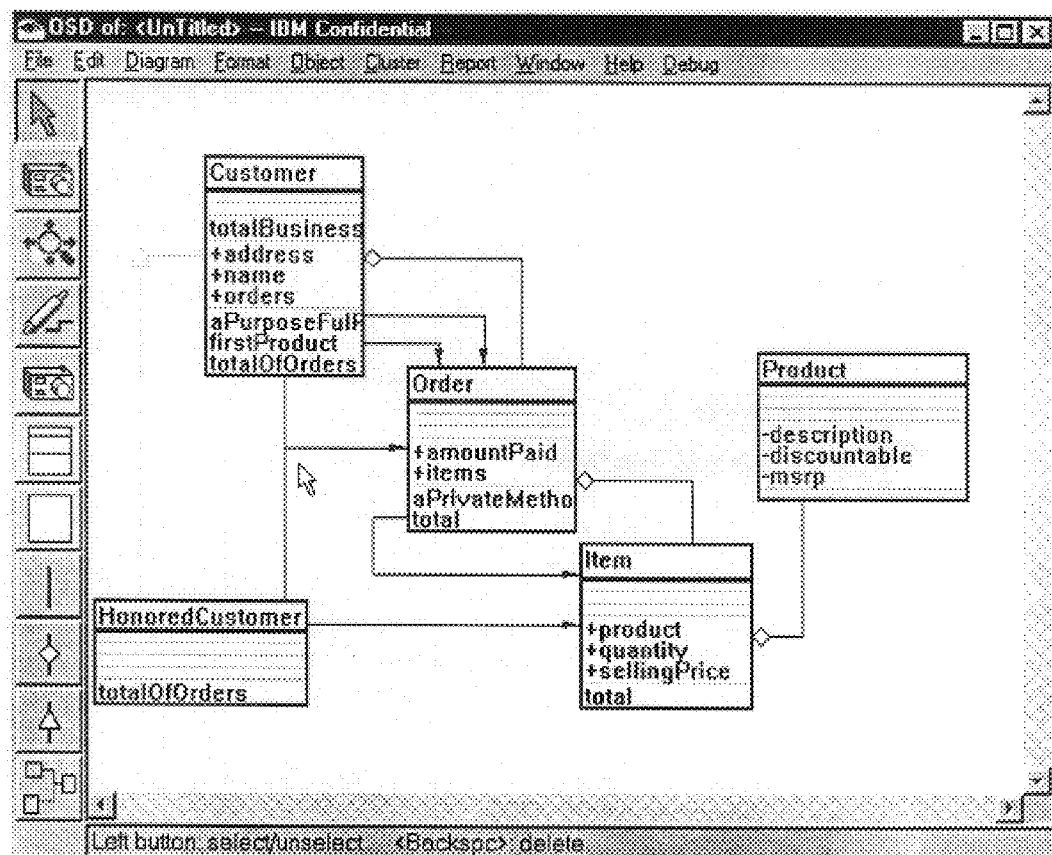
FIG. 12 shows the Object Structure Diagram after the save command is executed.

FIG. 12 shows the diagram after the save command is executed. Note that the firstProduct label and the collaboration lines are no longer colored blue, reflecting the fact that they are committed items on the diagram.

Figure 13:
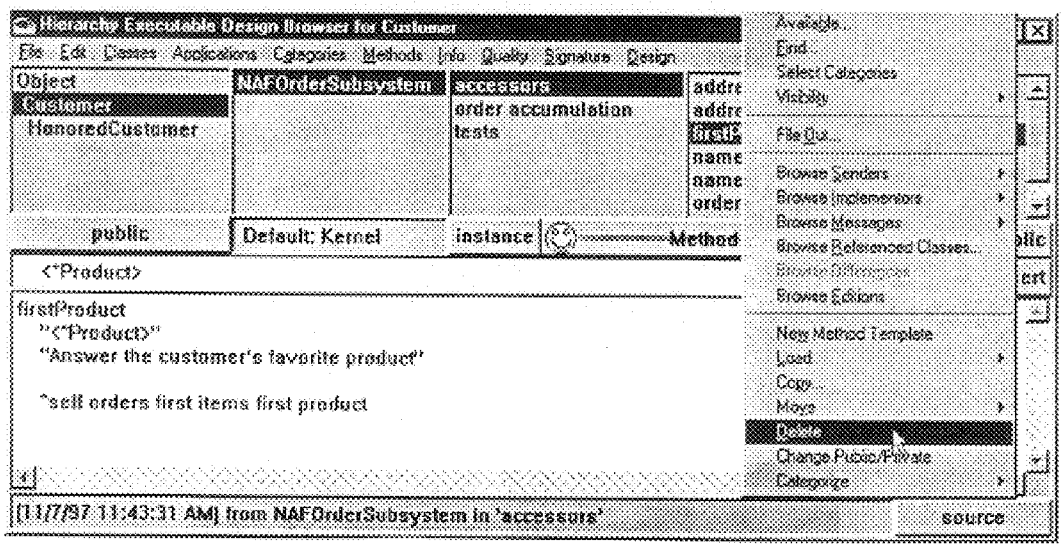
FIG. 13 shows the same VisualAge for SmallTalk code browser being used to delete the "firstProduct" method from the Customer class.

Some time may once again pass. During this time, further code changes can happen. FIG. 13 shows the same VisualAge for Smalltalk code browser being used to delete the firstProduct method from the Customer class.

Figure 14:
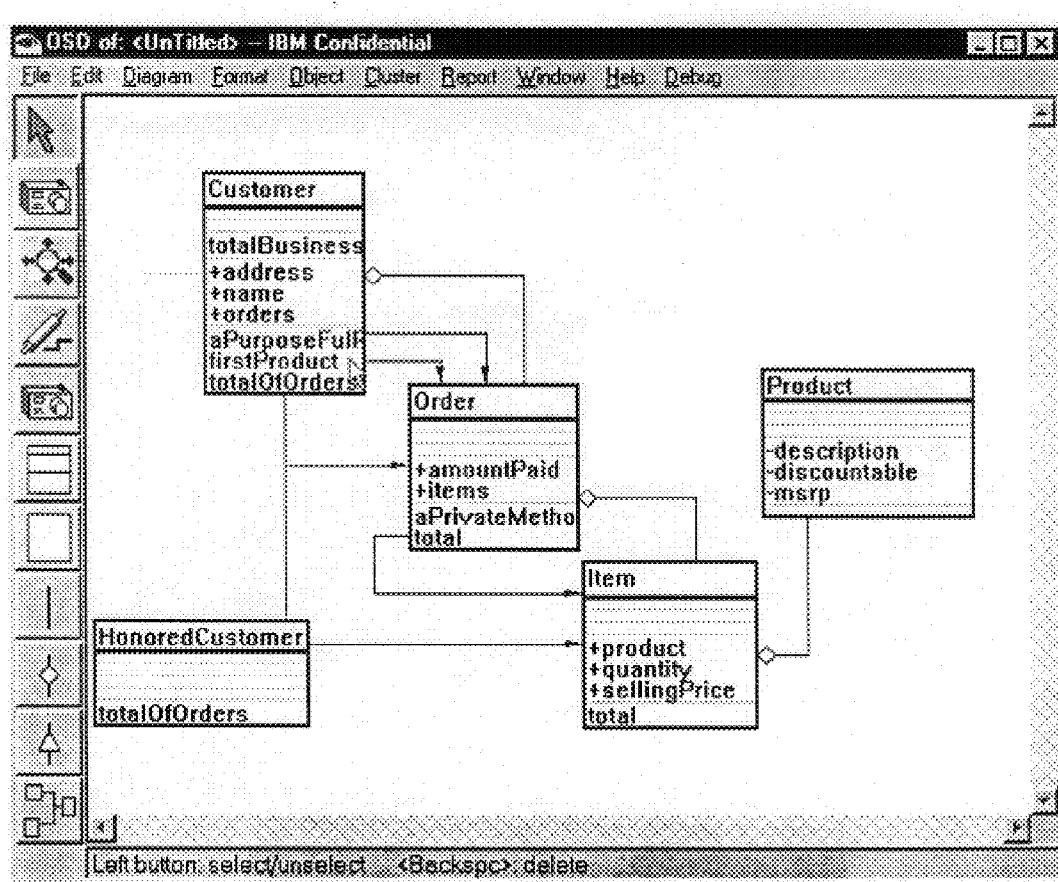
FIG. 14 shows the Object Structure Diagram after the deletion of the "firstproduct" method from the Customer class.

This change in the code is not reflected in the current state of the diagram. When the designer returns to the diagram, the deletion of this method is immediately apparent, as shown in FIG. 14. Note that the label of the method that was deleted, firstProduct, is colored red, as is the collaboration lines that were associated with the method. The color red indicates that an item appears on the diagram, but no longer appears in the Smalltalk code associated with the design. This is a warning to the designer that this part of the design has been changed (deleted) from the code.

Figure 15:
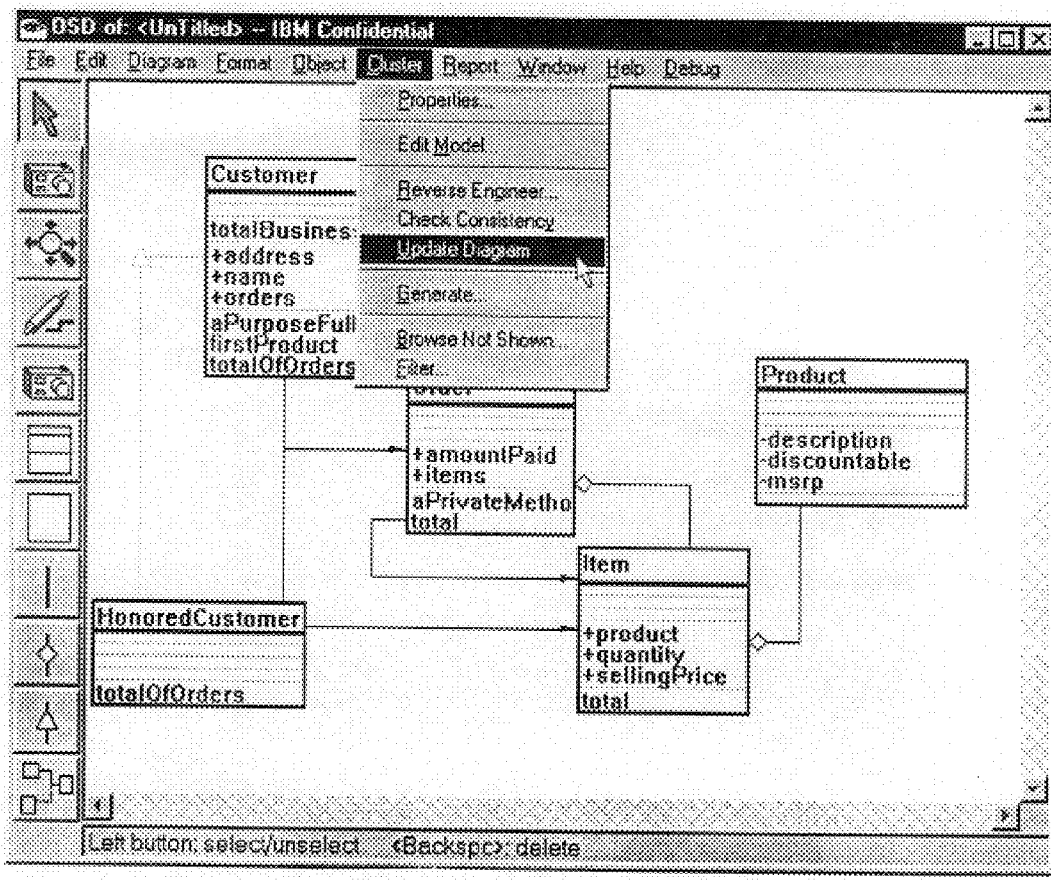
FIG. 15 shows the selection of the "Update Diagram" from the "cluster" menu, to update the Object Structure Diagram to reflect the current state of the SmallTalk code.
Figure 16:
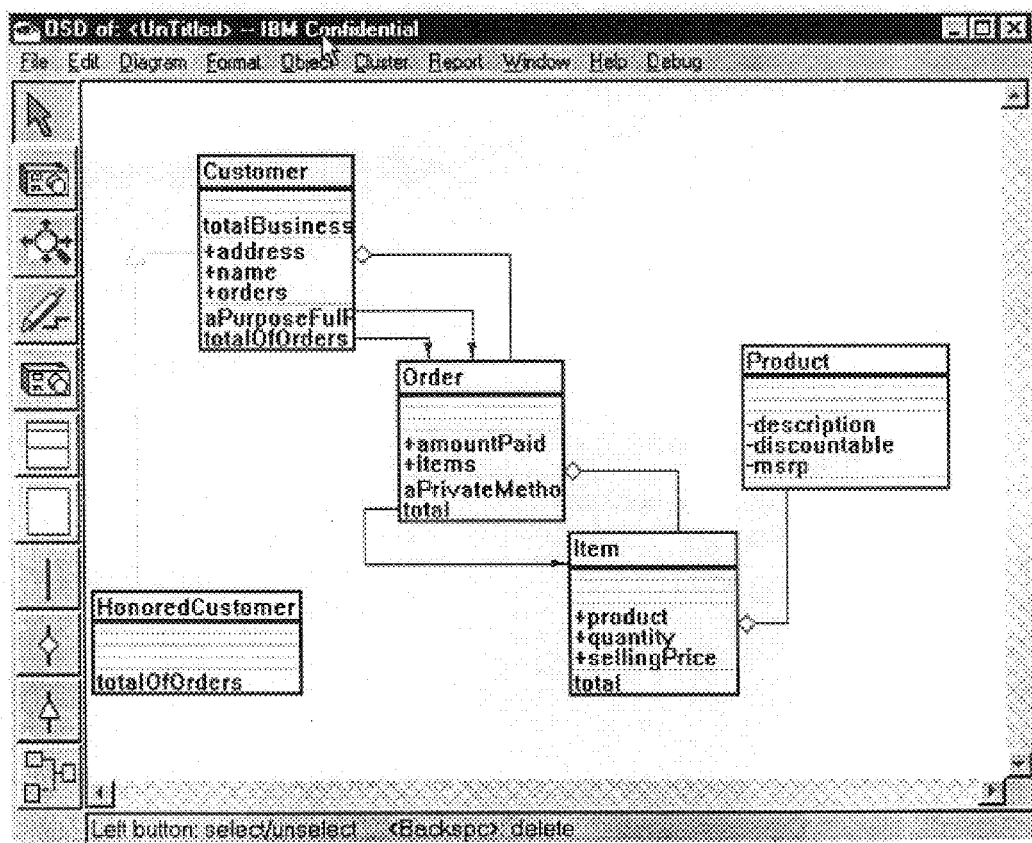
FIG. 16 shows the updated Object Structure Diagram.

Once again, the designer is notified of a deviation between the design and the code. He or she must now verify that the deviation from the design is acceptable. If the deviation is acceptable, the diagram must be updated to reflect the current state of the Smalltalk code. The designer can use the menu item labeled Update Diagram from the menu labeled Cluster to make this change as shown in FIG. 15. The result of this action, the updated diagram with the figures in red removed appears in FIG. 16.

Although a specific embodiment of the invention has been disclosed, it will be understood by those having skill in the art that changes can be made to that specific embodiment without departing from the spirit and scope of the invention.

What is claimed is:

1. A process of displaying differences between design artifacts and object-oriented code, comprising the steps of:

displaying a first design artifact depicting an existing design of a first object, including an existing method and an existing collaboration relationship with a second object;

providing a first representation of a current state of classes and methods of the first object in a meta-data format;

storing modified object oriented code representing a modified design of said first object, including a modified method;

providing a second representation of a state of classes and methods of the modified design of the first object in a meta-data format;

executing, in a design virtual machine, said modified method, so as to derive associations among objects in said modified design;

comparing the first meta-data representation to the second meta-data representation;

displaying in a second design artifact, results of said design virtual machine execution of said modified method; and identifying a modified collaboration relationship with said second object by analyzing a modified message from said modified method to said second object.

2. The process of displaying differences between design artifacts and object-oriented code of claim 1, further comprising the step of:

displaying said modified collaboration relationship with said second object by juxtaposing at least portions of said first and second design artifacts.

3. The process of displaying differences between design artifacts and object-oriented code of claim 2, further comprising the step of:

highlighting said modified collaboration relationship.

4. The process of displaying differences between design artifacts and object-oriented code of claim 3, further comprising the step of:

displaying in a second design artifact, changes in attributes of said first object.

5. The process of displaying differences between design artifacts and object-oriented code of claim 4, further comprising the step of:

highlighting said changes in attributes of said first object.

6. The process of displaying differences between design artifacts and object-oriented code of claim 5, further comprising the step of:

displaying in a second design artifact, changes between said existing method and said modified method of said first object.

7. The process of displaying differences between design artifacts and object-oriented code of claim 6, further comprising the step of:

highlighting said changes between said existing method and said modified method of said first object.

8. The process of displaying differences between design artifacts and object-oriented code of claim 1, further comprising:

said design artifact is displayed as a CRC report format.

9. The process of displaying differences between design artifacts and object-oriented code of claim 1, further comprising:

said design artifact is displayed as an Object Structure Diagram format.

10. The process of displaying differences between design artifacts and object-oriented code of claim 1, further comprising:

said design artifact is displayed as an Object Interaction Diagram format.

11. A system of displaying differences between design artifacts and object-oriented code, comprising:

a display coupled to a processor, for displaying a first design artifact depicting an existing design of a first object, including an existing method and an existing collaboration relationship with a second object;

means for providing a first representation of a current state of classes and methods of the first object in a meta-data format;

memory coupled to said processor, for storing modified object oriented code representing a modified design of said first object, including a modified method;

means for providing a second representation of a state of classes and methods of the modified design of the first object in a meta-data format;

memory coupled to said processor, for storing a design virtual machine, said processor executing, in said design virtual machine, said modified method, so as to derive association among objects in said modified method;

means for comparing the first meta-data representation to the second meta-data representation;

said display displaying in a second design artifact, results of said design virtual machine execution of said modified method performed by said processor; and said processor identifying a modified collaboration relationship with said second object by analyzing a modified message from said modified method to said second object.

12. The system of displaying differences between design artifacts and object-oriented code of claim 11, further comprising:

said display displaying said modified collaboration relationship with said second object by juxtaposing at least portions of said first and second design artifacts.

13. The system of displaying differences between design artifacts and object-oriented code of claim 12, further comprising:

said display highlighting said modified collaboration relationship.

14. The system of displaying differences between design artifacts and object-oriented code of claim 13, further comprising:

said display displaying in a second design artifact, changes in attributes of said first object.

15. The system of displaying differences between design artifacts and object-oriented code of claim 14, further comprising:

said display highlighting said changes in attributes of said first object.

16. The system of displaying differences between design artifacts and object-oriented code of claim 15, further comprising:

said display displaying in a second design artifact, changes between said existing method and said modified method of said first object.

17. The system of displaying differences between design artifacts and object-oriented code of claim 16, further comprising:

said display highlighting said changes between said existing method and said modified method of said first object.

18. The system of displaying differences between design artifacts and object-oriented code of claim 11, further comprising:

said design artifact is displayed as a CRC report format.

19. The system of displaying differences between design artifacts and object-oriented code of claim 11, further comprising:

said design artifact is displayed as an Object Structure Diagram format.

20. The system of displaying differences between design artifacts and object-oriented code of claim 11, further comprising:

said design artifact is displayed as an Object Interaction Diagram format.

21. An article of manufacture for use in a computer, comprising:

a computer useable medium having computer readable program code means embodied therein for providing a process of displaying differences between design artifacts and object-oriented code, comprising:

computer readable program code means for causing a computer to display a first design artifact depicting an existing design of a first object, including an existing method and an existing collaboration relationship with a second object;

computer readable program code means for causing a computer to provide a first representation of a current state of classes and methods of the first object in a meta-data format;

computer readable program code means for causing a computer to store modified object oriented code representing a modified design of said first object, including a modified method;

computer readable program code means for causing a computer to provide a second representation of a state of classes and methods of the modified design of the first object in a meta-data format;

computer readable program code means for causing a computer to execute, in a design virtual machine, said modified method, so as to derive associations among objects in said modified design;

computer readable program code means for causing a computer to compare the first meta-data representation to the second meta-data representation;

computer readable program code means for causing a computer to display in a second design artifact, results of design virtual machine execution of said modified method; and computer readable program code means for causing a computer to identify a modified collaboration relationship with said second object by analyzing a modified message from said modified method to said second object.

22. The article of manufacture for use in a computer of claim 21, that further comprises:

computer readable program code means for causing a computer to display said modified collaboration relationship with said second object by juxtaposing at least portions of said first and second design artifacts.

23. The article of manufacture for use in a computer of claim 22, that further comprises:

computer readable program code means for causing a computer to highlight said modified collaboration relationship.

24. The article of manufacture for use in a computer of claim 23, that further comprises:

computer readable program code means for causing a computer to display in a second design artifact, changes in attributes of said first object.

25. The article of manufacture for use in a computer of claim 24, that further comprises:

computer readable program code means for causing a computer to highlight said changes in attributes of said first object.

26. The article of manufacture for use in a computer of claim 25, that further comprises:

computer readable program code means for causing a computer to display in a second design artifact, changes between said existing method and said modified method of said first object.

27. The article of manufacture for use in a computer of claim 26, that further comprises:

computer readable program code means for causing a computer to highlight said changes between said existing method and said modified method of said first object.

28. The article of manufacture for use in a computer of claim 21, that further comprises:

said design artifact is displayed as a CRC report format.

29. The article of manufacture for use in a computer of claim 21, that further comprises:

said design artifact is displayed as an Object Structure Diagram format.

30. The article of manufacture for use in a computer of claim 21, that further comprises:

said design artifact is displayed as an Object Interaction Diagram format.

* * * * *